United States Patent [19]
Collins

[11] Patent Number: 4,607,808
[45] Date of Patent: Aug. 26, 1986

[54] WEAR-RESISTANT CAPSTAN FOR BELT DRIVEN CARTRIDGE

[75] Inventor: Leslie M. Collins, White Bear Lake, Minn.

[73] Assignee: Minnesota Mining and Manufacturing Company, St. Paul, Minn.

[21] Appl. No.: 692,351

[22] Filed: Jan. 16, 1985

[51] Int. Cl.[4] .................. G03B 1/04; G11B 15/32; B65H 20/00
[52] U.S. Cl. .................. 242/192; 226/190; 474/166
[58] Field of Search .................. 242/192, 197–200, 242/55.19 A; 226/190, 192, 194; 474/161, 166, 167, 174, 178, 179, 190–192

[56] References Cited
U.S. PATENT DOCUMENTS

| | | |
|---|---|---|
| 3,236,431 | 2/1966 | Foreman .................. 226/190 |
| 3,626,774 | 12/1971 | Schon .................. 474/190 X |
| 3,692,255 | 9/1972 | Von Behren .................. 242/192 |
| 3,788,155 | 1/1974 | Cigala et al. .................. 474/190 X |
| 3,907,234 | 9/1975 | Sato et al. .................. 242/55.19 A |
| 4,326,659 | 4/1982 | Sato .................. 226/190 |
| 4,488,690 | 12/1984 | Merle .................. 242/192 |

Primary Examiner—Leonard D. Christian
Attorney, Agent, or Firm—Donald M. Sell; James A. Smith; David W. Anderson

[57] ABSTRACT

A conductive, carbon-filled acetal resin capstan within a belt driven tape cartridge is rotatably supported by a pin and includes a cylindrical outer surface for engaging a drive belt. The capstan is electrically conductive to dissipate static electrical charges and includes a polytetrafluoroethylene-filled acetal resin sleeve interposed between the pin and the capstan to increase the wear resistance of the capstan where it frictionally engages the cartridge.

3 Claims, 4 Drawing Figures

WEAR-RESISTANT CAPSTAN FOR BELT DRIVEN CARTRIDGE

BACKGROUND OF THE INVENTION

1. Field of the Invention

The present invention concerns a two-spool tape cartridge in which a flexible, elastic drive belt contacts the tape on the tape spools and whereby movement of the belt causes movement of the tape between the spools.

2. Description of the Prior Art

The belt driven cartridge of U.S. Pat. No. 3,692,255, issued to Von Behren and assigned to the assignee of the present invention, has been very successfully utilized to interface with computers where rapid acceleration and deceleration of the tape are required. In the cartridge there disclosed, a magnetic recording tape is convolutely wound on two tape spools and is bidirectionally driven between the spools by an endless flexible belt in frictional contact with the tape on both spools. The endless flexible belt is wrapped around and driven by a capstan within the cartridge, which capstan is in turn driven by a motor drive roller which is external to the cartridge and is a portion of a recording/playback tape recorder mechanism into which the cartridge is inserted. The motor drive roller engages the capstan by means of an access opening provided in a wall of the cartridge.

During operation of the cartridge, a static electrical charge is built up on the capstan by frictional contact between the motor drive roller and the capstan. If this static electrical charge is not dissipated, a sudden discharge may result which may cause erroneous signals in the electronics of the tape recorder mechanism.

The static charge problem may be alleviated by manufacturing the capstan of a conductive material such as metal or an electrically conductive polymer such as acetal resin containing carbon. The static charge will then either relocate and neutralize itself throughout the body of the capstan or be conducted to a grounded portion of the cartridge or tape recorder mechanism.

Unfortunately, to produce the capstan of metal is too expensive and carbon-filled acetal resin exhibits poor wear characteristics. Capstan wear is particularly noticeable at the areas of contact between the rotating capstan and its mounting pin and the capstan and surfaces of the cartridge. This wear results in looseness of the capstan relative to its mounting pin and particles which may interfere with the operation of the cartridge or the tape recorder mechanism.

SUMMARY OF THE INVENTION

The present invention provides a capstan which is resistant to wear and the build up of static electrical charges, without being unduly expensive, and includes an electrically conductive, polymeric capstan which in turn includes a wear-resistant polymer at the areas of contact between the capstan and its mounting pin and between the capstan and contacting surfaces of the cartridge.

Particularly, the capstan is manufactured of carbon-filled acetal resin and includes a polytetrafluoroethylene-filled acetal resin sleeve interposed between the capstan and its mounting pin, with the sleeve engaging the capstan and being rotatably supported by the mounting pin. The sleeve preferably includes a radially extending projection which engages a recess in the capstan to prevent relative axial or rotational movement between the capstan and the sleeve.

The polytetrafluoroethylene-filled acetal resin sleeve exhibits very good wear characteristics and the capstan does not allow a buildup of static electrical charges even though the sleeve is electrically nonconductive and, therefore, the capstan is not grounded. This is not completely understood but is presumably because the electrical conductivity of the carbon-filled acetal resin capstan allows the static charge to relocate and neutralize itself within the body of the capstan.

BRIEF DESCRIPTION OF THE DRAWINGS

The present invention will be more particularly described with reference to the accompanying drawings, wherein like numbers refer to like parts in the several views, and wherein.

DESCRIPTION OF THE PREFERRED EMBODIMENTS

Figure 1:
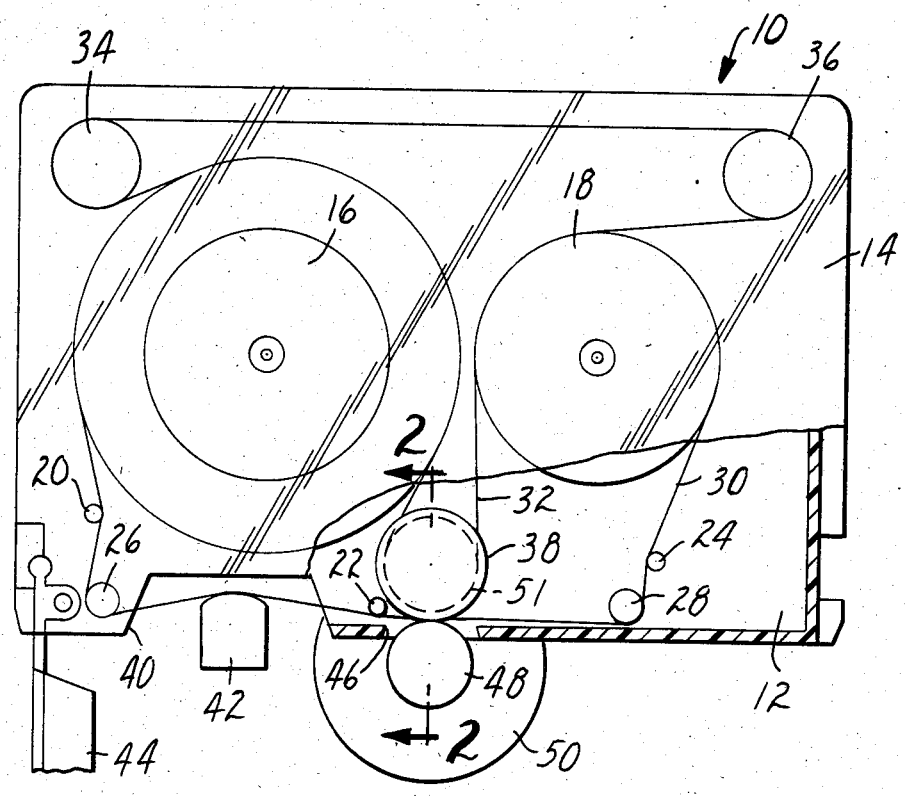
FIG. 1 is a top plan view of a belt driven tape cartridge, partially in section, containing a capstan and sleeve of the present invention.

FIG. 1 illustrates a data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving capstan 38.

The tape spools 16 and 18 are supported by the cartridge base plate 12 for free rotation about spaced parallel axes. The magnetic recording tape 30 is convolutely wound on the tape spools 16 and 18 in opposite directions about their axes. The tape 30 guide path between the tape spools 16 and 18 is defined by the three tape wrap pins 20, 22 and 24 and the two tape guides 26 and 28.

The cartridge 10 is formed with a recess 40 along the tape path which provides access to the magnetic tape 30 by a magnetic transducer 42. The recess 40 is normally closed by a spring-loaded door 44 which is opened as shown upon insertion of the data cartridge 10 into a tape recorder (not shown). An opening 46 is provided in the cartridge cover 14 to provide access to the belt driving capstan 38 by a drive roller 48 driven by a reversible motor 50. The magnetic transducer 42, the drive roller 48 and the reversible motor 50 form a portion of the tape recorder rather than the data cartridge 10.

The cartridge belt driving capstan 38 is provided with a reduced diameter 51 to prevent contact between the driving belt 32 and the drive roller 48. The driving belt 32 is thin, continuous, flexible and elastic. It has a uniform cross-sectional area and extends around the belt driving capstan 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving roller 38 in a counterclockwise direction (as viewed in FIG. 1) by the drive roller 48 causes the belt 32 to traverse its path in a counterclockwise direction and the tape 30 to move from the tape spool 18 to the tape spool 16, the tape spool 18 serving as a supply spool and the tape spool 16 serving as a take-up spool. Opposite rotation of the driving roller 38 by the drive roller 48 will cause tape to be supplied by the tape spool 16 and convolutely wound upon the tape spool 18. A predetermined frictional coupling between the belt guide rollers 34 and 36 and their respective support shafts applies a predetermined drag to the belt 32 as it passes around the guide rollers 34 and 36, thereby increasing the tension of the belt 32 as it passes around each of the belt guide rollers 34 and 36. This increased tension in the belt 32 increases the length of the belt 32 according to its elasticity and thereby the speed at which the belt 32 passes around one spool 16 or 18 is increased compared to that at which it passes around the other spool 16 or 18. This increased speed causes tension in the tape 30 as well as the ability to take up any slack developed in the tape 30 between the tape spools 16 and 18 as is more fully taught in U.S. Pat. No. 3,692,255.

Figure 2:
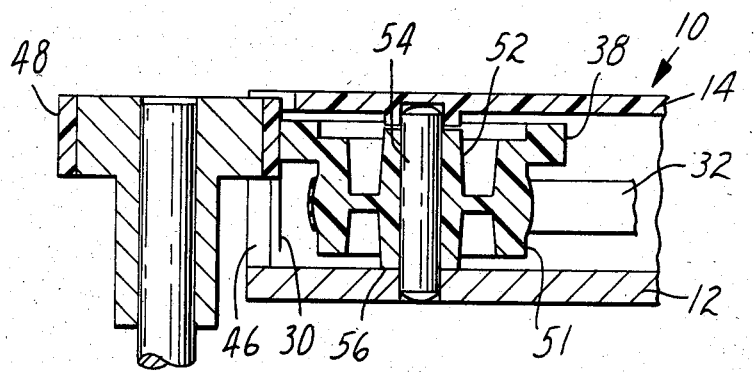
FIG. 2 is a cross-sectional view of a prior art capstan, a drive roller and a portion of the cartridge of FIG. 1 taken generally along the line 2—2 of FIG. 1.

FIG. 2 is a cross-sectional view of the drive roller 48, a portion of the cartridge 10 and the belt driving capstan 38 of the prior art as described in U.S. Pat. No. 3,692,255. This prior capstan 38 included a central hub 52 which was rotatably supported by a steel pin 54 which is press fit into the plate 12. The capstan 38 was molded of acetal resin, which exhibits acceptable wear characteristics but which is electrically nonconductive.

Although the prior acetal resin capstan 38 performed well for a number of years since its introduction in 1972, the operational speed of the data cartridge 10 has steadily increased since that time, and it has been observed recently that a detrimental static electrical charge is built up on the capstan 38 by its contact with the drive roller 48. This static electrical charge on the capstan 38 is caused by the fact that acetal resin is nonconductive and must be dissipated or the static electricity will discharge suddenly and may create false data pulses within the electronics of the tape recorder mechanism.

It was attempted to cure the static electricity problem by molding the capstan 38 of a carbon-filled acetal resin, which is electrically conductive. Unfortunately, carbon within the acetal resin is detrimental to its wear characteristics and it was observed that detrimental wear was occurring between the hub 52 of the capstan 38 and the steel pin 54 and also between the lower end 56 of the hub 52 and the cartridge plate 12. The wearing of the central hub 52 causes looseness between the capstan 38 and the pin 54, which results in vibration and noise as the capstan 38 rotates during operation. Wearing of the capstan 38 also produces minute particles within the cartridge 10 which may interfere with operation of the cartridge 10 and the tape recorder mechanism.

A solution to this seeming impasse is provided by the present invention wherein the capstan 38 is molded as two distinct parts rather than the solid structure of FIG. 2.

Figure 3:
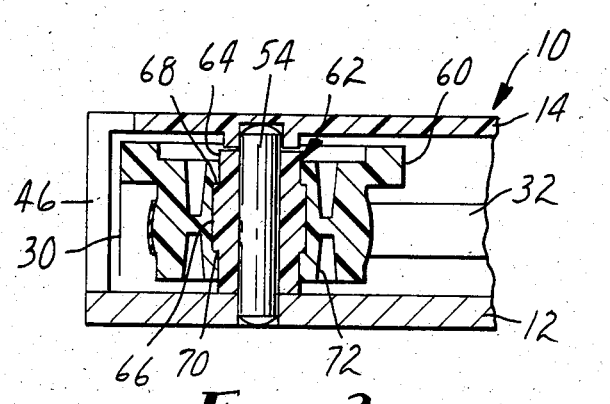
FIG. 3 is a cross-sectional view of a capstan and a sleeve according to the present invention, and a partial cross-sectional view of the data cartridge of FIG. 1, taken generally along the line 2—2 of FIG. 1.

The improved version is shown in FIG. 3, wherein a capstan 60, manufactured of conductive, carbon-filled acetal resin, is provided with an inner sleeve 62 which is manufactured of plain acetal resin or, preferably, polytetrafluoroethylene-filled acetal resin. Adequate wear characteristics would probably result if the sleeve 62 were manufactured of plain acetal resin, but polytetrafluoroethylene enhances the wear resistance properties of acetal resin, and, therefore, a polytetrafluoroethylene-filled acetal resin for the sleeve 62 is preferred.

The capstan 60 of FIG. 3 is preferably molded as the second step of a two-step process in which the sleeve 62 is molded and then placed within a secondary mold which produces the capstan 60. The sleeve 62 includes a cylindrical body 64 which is provided with a raised diameter 66 located approximately midway along the length of the sleeve 62. The purpose of the increased diameter 66 is to provide horizontal shoulders 68 and 70 which axially lock the sleeve 62 to the central hub 72 of the capstan 60.

Operation of the sleeve 62 and capstan 60 assembly of FIG. 3 has revealed that wear is greatly reduced and also that a detrimental static electrical charge is not produced on the capstan 60. This result is somewhat surprising since the acetal resin or polytetrafluoroethylene-filled acetal resin which comprises the sleeve 62 is nonconductive and, therefore, provides no conductive path to ground for a static charge induced on the capstan 60. The absence of a static electrical charge on the capstan 60 is not completely understood, but it is believed that the use of conductive, carbon-filled acetal resin allows the static charge to relocate and neutralize itself within the polymer structure of the capstan 60.

Figure 4:
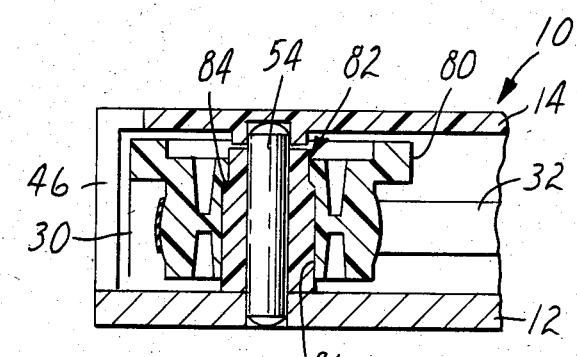
FIG. 4 is a cross-sectional view of an alternate embodiment of a capstan and a sleeve according to the present invention, and a partial cross-sectional view of the data cartridge of FIG. 1 taken generally along the line 2—2 of FIG. 1.

FIG. 4 illustrates an alternate embodiment of a capstan 80 and a sleeve 82 which is provided with only a single shoulder 84 rather than the two shoulders 68 and 70 illustrated in FIG. 3. The provision of a single shoulder 84 has been shown to be adequate to prevent relative axial movement between the sleeve 84 and the capstan 80, and allows the sleeve 82 and the capstan 80 to be molded as completely separate parts and later assembled by press fitting the sleeve 82 into a matching bore 86 molded in the capstan 80. The capstan 80 of FIG. 4, however, could also be molded in a two-step process as described with respect to FIG. 3 by first molding the sleeve 82 and inserting this molded part into a subsequent mold used to form the capstan 80.

The configuration of FIG. 3 is preferred if a two-step molding process is to be used and the configuration of FIG. 4 is preferred if it is desired to mold the parts separately and later assemble them. The configurations shown are preferred because they simply include cylindrical surfaces for which molds may be easily manufactured. It should be recognized, however, that many other configurations could be utilized. For example, the shoulder 84 includes a transitional area between the larger and smaller diameters which is conical rather than horizontal as illustrated by the shoulder 68 of FIG. 3. The shoulder 68 or 84 could also be convexly or concavely rounded. Furthermore, if the capstan 60 or 80 is to be manufactured by a two-step molding process, the locking radial projection created by the increased diameter of the sleeve 62 or 82 need not be completely circumferential with respect to the sleeve 62 or 82. The sleeve 62 or 82 could be molded with discrete projections extending radially outward or could be provided with discrete recesses extending radially inward from the surface of the sleeve 62 or 82. Such axial projections or recesses would cause corresponding recesses or projections, respectively, in the capstan 60 or 80 as it is molded around the sleeve 62 or 82 which would serve to lock the two pieces together.

It also should be recognized that the cross-sectional shape of the sleeve 62 or 82 need not be cylindrical, whether the capstan 60 or 80 is to be manufactured by two-step molding or assembly after the parts are molded separately. A square, oval or triangular cross-section, for example, would provide the additional benefit of increased resistance to relative rotational movement between the sleeve 62 or 82 and the capstan 60 or 80. This problem has not been manifest, however, and so the configurations illustrated in FIGS. 3 and 4 are preferred for their simplicity.

By manufacturing the capstan 60 or 80 of carbon-filled acetal resin and the sleeve 62 or 82 of polytetrafluoroethylene-filled acetal resin, the present invention provides a capstan 60 or 80 which does not retain a static electrical charge and which provides a wear-resistant surface adjacent the pin 54 and the cartridge plate 12.

Although the present invention has been described with respect to only a limited number of preferred embodiments, it is recognized that modifications will be apparent to those skilled in the art. All such modifications which fall within the spirit and scope of the appended claims are intended to be included in the present invention.

I claim:

1. A capstan assembly rotatably supported by a mounting pin between spaced, parallel walls of a tape cartridge and having a cylindrical outer surface engaging a drive belt, comprising:
    a conductive, carbon-filled acetal resin capstan providing said cylindrical outer surface; and
    a wear-resistant, acetal resin sleeve interposed between said pin and said capstan, which sleeve engages said capstan and is rotatably supported by said pin.

2. A capstan assembly according to claim 1 wherein said capstan includes a recess adjacent said sleeve and said sleeve includes a corresponding radial projection engaging said recess to lock said sleeve and said capstan together and thereby prevent relative movement between said capstan and said sleeve.

3. A capstan assembly according to claim 1 wherein said acetal resin sleeve further includes a polytetrafluoroethylene filler.

* * * * *